United States Patent [19]

Wakita et al.

[11] Patent Number: 5,067,993
[45] Date of Patent: Nov. 26, 1991

[54] MAGNETIC CORE MATERIAL MADE OF FE-CO BASE ALLOY FOR HIGH FREQUENCIES

[75] Inventors: Saburo Wakita, Noda; Kiyoshi Yamaguchi, Minamisaitama; Norio Yanagisawa, Kitamoto, all of Japan

[73] Assignee: Mitsubishi Materials Corporation, Tokyo, Japan

[21] Appl. No.: 345,549

[22] PCT Filed: Aug. 18, 1988

[86] PCT No.: PCT/JP88/00817

§ 371 Date: Apr. 14, 1989

§ 102(e) Date: Apr. 14, 1989

[87] PCT Pub. No.: WO89/01533

PCT Pub. Date: Feb. 23, 1989

[30] Foreign Application Priority Data

Aug. 19, 1987 [JP] Japan ................................ 62-205940

[51] Int. Cl.$^5$ .............................................. H01F 1/04
[52] U.S. Cl. ..................................... 148/311; 148/306; 148/308; 148/313; 148/315; 420/9; 420/99; 420/117; 420/120; 420/435; 420/581
[58] Field of Search ................ 148/306, 307, 308, 311, 148/313, 315; 420/9, 99, 117, 120, 435, 581

[56] References Cited

U.S. PATENT DOCUMENTS

| 3,891,475 | 6/1975 | Tomita et al. | 148/311 |
| 4,116,727 | 9/1978 | Major | 148/307 |

FOREIGN PATENT DOCUMENTS

| 53-108824 | 9/1979 | Japan | 148/311 |
| 62-227064 | 10/1987 | Japan . | |
| 63-11650 | 1/1988 | Japan . | |
| 571676 | 9/1945 | United Kingdom | 148/311 |

*Primary Examiner*—John P. Sheehan
*Attorney, Agent, or Firm*—Frishauf, Holtz, Goodman & Woodward

[57] ABSTRACT

A magnetic core material made of a Fe-Co base alloy for use at high frequencies, and has excellent high-frequency alternating magnetic properties. The core material composition is Co: 45-53% by weight, C: 0.3-3% by weight, one or both of Mn and Si: 0.1-2% by weight, at least one of Mg, Ca, and Ce: 0.1-0.2% by weight, and the remainder Fe and unavoidable impurities. The structure of the alloy comprises a ferrite matrix containing graphite in an amount of from 1-20% by volume dispersed therein. The material is applied, for example, in a dot impact printer and to a pulse motor.

27 Claims, 1 Drawing Sheet

MAGNETIC CORE MATERIAL MADE OF FE-CO BASE ALLOY FOR HIGH FREQUENCIES

BACKGROUND OF THE INVENTION

This invention relates to a magnetic core material made of Fe-Co base alloy for use at high frequencies, and which has excellent high-frequency alternating magnetic properties. The core material is used in a head core and a plunger yoke of a dot impact printer, and further in a stator and a rotor of a pulse motor.

Such a magnetic core material for use at high frequencies with high frequency signals usually should have a characteristic that a magnetic flux induced due to an applied current rises, and eddy current losses due to an excess current are reduced by making a current resistance ratio of the magnetic core large. Therefore, most magnetic core materials are made of an Fe base casting alloy and have a relatively large current resistance ratio, and excellent magnetic properties. The materials have a composition of 2-3.5% by weight Si and the remainder of Fe and unavoidable impurities. Throughout the following, all percentages refer to weight percentages.

Recently, a word processor, for example, needs to be small-sized and to have high-performance. Therefore, a material of high saturated magnetic flux density should be utilized for a head core of a dot impact printer in order to form a compact head core. In order to meet these requirements, attempts were made to use an alloy of high magnetic flux density, e.g. 50% Fe–50% Co casting alloy, instead of said Fe-Si casting alloy mentioned above (See "Preliminary Lecture Paper of the 23rd autumn Meeting", Japan Electric Material Technique Association). However, such an alloy of high magnetic flux density has lower high-frequency magnetic properties than one expects, partly because of a small current resistance. A magnetic core material made of said Fe-Co alloy has a poor magnetic flux rise because of a large eddy current loss. Therefore, the magnetic core material made of the Fe-Co alloy cannot meet the requirements of high-speed printing operations and clarity of printing which are needed in a word processor.

SUMMARY OF THE INVENTION

An object of the present invention is to produce a magnetic core material for use at high frequencies, and which has excellent high-frequency alternating magnetic properties.

According to the present invention, a magnetic core material for use with high frequency signals is made of a Fe-Co base alloy, whose composition is 45–53% of Co, 0.3–3%, preferably 0.5–1.5% of C, 0.1–2% of one or both of Mn and Si, 0.01–0.2% of at least one of Mg, Ca, and Ce as needed, and the remainder of Fe and unavoidable impurities, the structure of the alloy comprising a ferrite matrix containing graphite in an amount of from 1–20% by volume dispersed therein.

The magnetic core material of the present invention has better high-frequency alternating magnetic properties than the conventional magnetic core made of Fe-Co casting alloy, suffers little eddy current loss, and gives improved magnetic flux rising. Therefore, the magnetic core material of the present invention readily meets the requirements of machines of high-speed, small-size and high-performance.

The present invention was developed based on the above findings. Below are descriptions as to the reasons for including ingredients in the Fe-Co base alloy which forms a magnetic core material for high frequency us according to the present invention, for limiting ranges of ratios of the compositions included, and for limiting the ratio of graphite as stated above. (a) Co The reason for including Co as an ingredient is that Co together with Fe in the specified amounts provides a solid solution of a phase resulting in prominently high magnetic flux density. Also, the reason for limiting the ratio of Co is that a desired high magnetic flux density cannot be ensured when the ratio of Co is less than 45% or more than 53%. Consequently, the amount of Co is determined to be 45–53% in the present invention.

(b) C

The reason for including C as an ingredient is that most of the C ingredient forms graphite which is dispersed in the ferrite matrix, resulting in improvements in high-frequency alternating magnetic properties. The reason for limiting the ratio of C is that when the ratio is less than 0.3%, a volume ratio of graphite dispersed in the matrix is less than 1% and the desired improvements in high-frequency alternating magnetic properties cannot be ensured. When the ratio of C is more than 3%, a volume ratio of graphite is excessively more than 20% and high-frequency alternating magnetic properties are inversely deteriorated. Consequently, the amount of C is determined 0.3–3% in the present invention. Particularly, 0.5–1.5% is preferable in the present invention.

(c) Mn and Si

The reason for including these ingredients is that they show an activity by deoxidation, resulting in improvements in high-frequency alternating magnetic properties. The reason for limiting the ratio of these ingredients as stated above is that a desired deoxidation effect cannot be ensured when the ratio is less than 0.1% while high-frequency alternating magnetic properties tend to be deteriorated when the ratio is more than 2%. Consequently, the ratio is thus determined to be 0.1–2% in the present invention.

(d) Mg, Ca, and Ce

The reason for including these ingredients is that they dissolve and become solute atoms in a ferrite matrix to improve a current resistance of the matrix, resulting in improvement in high-frequency alternating magnetic properties. These ingredients further exhibit a degassing effect to reduce the ratios of both of oxygen and nitrogen included in the alloy, resulting in improving the high-frequency alternating magnetic properties. Therefore, if better high-frequency alternating magnetic properties are required, these ingredients are included as needed. The reason for limiting the ratio of the ingredients as stated above is that when the ratio is less than 0.01%, the desired effect due to said degassing activity cannot be obtained, while if the ratio is more than 0.2%, graphitization is difficult and also cementite ($Fe_3C$) is crystallized, resulting in deterioration of the high-frequency alternating magnetic properties. The ratio of these ingredients is determined to be 0.01–0.2% in the present invention.

(e) A volume Ratio of Graphite

As described above, graphite dispersion in a ferrite matrix allows prominent improvements in high-frequency alternating magnetic properties. However, the desired improvements in high-frequency alternating magnetic properties cannot be ensured when the volume ratio of graphite is less than 1%, and also high-frequency alternating magnetic properties inversely tend to be deteriorated when the volume ratio is more than 20%. Consequently, the volume ratio of graphite is determined to be 1–20% in the present invention.

Also, although graphite of any shape improves the high-frequency alternating magnetic properties, a comparison of, for example, a spheroidal graphite with a flake graphite indicates that a magnetic core material utilizing a spheroidal graphite shows better high-frequency alternating magnetic properties than that utilizing a flake graphite, under the condition that the amount of the spheroidal graphite included is the same as that of a flake-shaped graphite. The present inventors consider that this is because spheroidal graphite more effectively suppresses the occurrence of a eddy current. In order to improve the high-frequency alternating magnetic properties, spheroidal graphite is preferably utilized in a metal composition where a mean diameter of the spheroid is 0.5–50 μm, and preferably 2–4 μm.

Since a magnetic core material of the present invention for use at high frequencies shows surprisingly excellent high-frequency alternating magnetic properties, utilization of the magnetic core in a head core material and a plunger yoke of a dot impact printer, or in a stator and a rotor of a pulse motor shows excellent effects and readily enables speeding-up of the operation of the dot impact printer and the pulse motor, and therefore enables them to have high-performance. Moreover, since the magnetic core material has such a metal construction wherein graphite is dispersed therein, it has better processibility than the conventional Fe-Co base alloy which is likewise utilized in these applications.

DETAILED DESCRIPTION OF THE INVENTION

Figure 1:
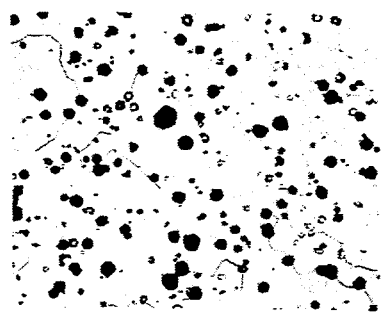
FIG. 1 is a microphotograph at a magnification of 500 of a metal composition (50%Fe-48.9%Co-1.1%C) of a magnetic core material made of Fe-Co base alloy for use at high frequencies, showing one example of the present invention.

Next, a magnetic core material for use at high frequencies according to the present invention will be described with reference to the drawings.

By utilizing the conventional high frequency induction melting furnace, a molten metal is prepared having a given composition and then Mg, Ca, Ce, and Si (Si is provided as an alloy of Fe-Si) of alloy compositions were totally or partly inoculated in the molten metal, provided that when spheroidal graphite was to be formed, at least one or more than two ingredients selected among Mg, Ca, and Ce, and Fe-Si alloy were inoculated, and when flake graphite was formed, Fe-Si alloy was inoculated. After inoculation, the molten metal was cast to obtain a spheroidal graphite containing casting and a flake graphite containing casting which has dot cores (for 9 pins of a dot impact printer) and which is used as a magnetic core material for use at high frequencies. The spheroidal graphite containing casting was sequentially kept at 850° C. for 3 hours by utilizing a vacuum heating furnace and was subjected to annealing under the condition of furnace cooling. The flake graphite containing casting was kept at 750° C. for 2 hours by utilizing a vacuum furnace, and was subjected to annealing under the condition of furnace cooling. Consequently, each casting has a structure wherein graphite is dispersed in a ferrite matrix. Therefore, by processing the casting to form a finished shape, dot core specimens 1–17 of the present invention made of Fe-Co base alloy having ingredient ratios and a graphite ratio each of which is respectively shown in Table 1 was formed.

Further, for a comparison, a molten metal having the same composition ratio of comparative dot specimens 1–5 as shown in Table 1 was prepared, immediately cast and processed to form a finished shape. The ratio of ingredients included in each of the resulting dot cores 1–5 respectively departs from that according to the present invention. The mark "*" in Table 1 shows a ratio departing from that of the present invention.

Next, for each dot core as obtained above, two cores were contacted wherein each end surface of each pin of the cores were exactly put together by means of a non-magnetic medium of 0.3 mm thickness, and a coil was wound around the pin of one dot core applied between the coil terminals under the conditions: switching cycle: 50 Hz; voltage between coil terminals: 30 V; switching time: 220 μs; and magnetomotive force (Ni): 150 ampere/turn (current x the number of coil turns). The resulting magnetic flux $\phi$ induced in pins of the dot core was measured in order to evaluate the high-frequency alternating magnetic properties.

A pin of a dot core has a sectional rectangular shape of 9.6 mm in length $\times$ 0.17 cm$^2$ in sectional area $\times$ 2.3 mm in width. A magnetic flux $\phi$ is measured by a search coil and calculated by the following formula:

$$\phi = (1/Ns) \int e \, dt \, (wb)$$

where Ns: the number of search coil turns (=3), and e: voltage induced between search coils, utilizing a waveform analyzer. The results are shown in Table 1. Table 1 also shows a volume ratio of graphite dispersed in a matrix.

TABLE 1

| specimen | | ingredient composition % by weight | | | | | | | graphite | | magnetic |
| --- | --- | --- | --- | --- | --- | --- | --- | --- | --- | --- | --- |
| | | Co | C | Mn | Si | Mg | Ca | Ce | Fe + impurities | shape | Volume ratio (%) | flux $\phi$ (wb) ($\times 10^{-6}$) |
| dot cores of the present invention | 1 | 45.5 | 1.00 | 0.65 | — | tr | — | — | remainder | spheroidal | 5.5 | 14.7 |
| | 2 | 49.2 | 0.93 | 0.74 | — | tr | — | — | | spheroidal | 5.2 | 16.4 |
| | 3 | 52.7 | 1.11 | 0.72 | — | tr | — | — | | spheroidal | 5.8 | 14.3 |
| | 4 | 49.4 | 0.34 | 0.76 | — | — | tr | — | | spheroidal | 1.3 | 13.8 |
| | 5 | 49.0 | 0.65 | 0.80 | — | — | — | tr | | spheroidal | 3.7 | 16.6 |

TABLE 1-continued

| specimen | | ingredient composition % by weight | | | | | | | Fe + impurities | graphite shape | Volume ratio (%) | magnetic flux φ (wb) (×10⁻⁶) |
|---|---|---|---|---|---|---|---|---|---|---|---|---|
| | | Co | C | Mn | Si | Mg | Ca | Ce | | | | |
| | 6 | 48.6 | 1.04 | 0.75 | — | — | — | — | | flake | 5.1 | 13.7 |
| | 7 | 49.3 | 2.12 | 0.72 | — | tr | — | — | | spheroidal | 11.4 | 16.0 |
| | 8 | 48.7 | 2.88 | 0.75 | — | tr | — | — | | spheroidal | 18.6 | 13.8 |
| | 9 | 49.1 | 0.86 | 0.12 | — | — | — | — | | flake | 4.6 | 12.0 |
| | 10 | 49.2 | 0.93 | 1.88 | — | — | — | tr | | spheroidal | 5.3 | 12.7 |
| | 11 | 48.7 | 1.01 | | 0.58 | tr | — | — | | spheroidal | 6.4 | 15.9 |
| | 12 | 49.0 | 1.12 | 0.70 | 0.32 | tr | — | — | | spheroidal | 6.5 | 16.8 |
| | 13 | 48.4 | 0.97 | 0.78 | — | 0.02 | — | — | | spheroidal | 6.2 | 17.0 |
| | 14 | 49.1 | 0.90 | 0.74 | — | — | 0.08 | — | | spheroidal | 5.0 | 17.3 |
| | 15 | 48.3 | 0.92 | 0.75 | — | — | — | 0.18 | | spheroidal | 5.3 | 16.1 |
| | 16 | 48.6 | 0.96 | — | 0.64 | 0.06 | 0.02 | — | | spheroidal | 5.8 | 16.8 |
| | 17 | 49.0 | 1.01 | 0.60 | 0.55 | 0.04 | 0.02 | 0.03 | | spheroidal | 5.8 | 17.5 |
| comparative dot cores | 1 | 43.1* | 0.95 | 0.73 | — | tr | — | — | | spheroidal | 5.4 | 8.9 |
| | 2 | 53.8* | 1.02 | 0.70 | — | tr | — | — | | spheroidal | 5.8 | 7.2 |
| | 3 | 49.0 | —* | 0.65 | — | — | — | — | | — | —* | 6.6 |
| | 4 | 48.7 | 0.21* | 0.50 | — | — | — | — | | flake | 0.8* | 7.4 |
| | 5 | 49.4 | 3.81* | 0.60 | — | — | — | — | | flake | 22.5* | 7.7 |

(*ratio which departs from that in the present invention)

From the results shown in Table 1, it is clear that all dot cores 1–17 of the present invention which have a composition wherein spheroidal graphite or flake graphite are dispersed in a ferrite matrix, show excellent high-frequency alternating magnetic properties, while comparative dot cores 1–5 do not show sufficient high-frequency alternating magnetic properties, even if only one ratio of ingredients departs from that according to the present invention (for C ingredient, a volume ratio of graphite also departs from that according to the invention).

Figure 2:
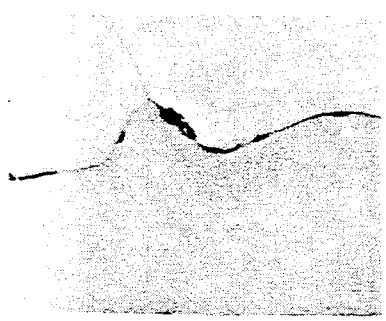
FIG. 2 is a microphotograph at a magnification of 500 of a metal construction (50%Fe-50%Co) of a conventional magnetic core material made of Fe-Co base alloy for use at high frequencies.

FIG. 1 is a microphotograph showing a metal composition of a magnetic core material made of Fe-Co base alloy for use at high frequencies in accordance with the present invention, and FIG. 2 is a microphotograph showing a metal composition of a conventional magnetic core material made of Fe-Co base alloy for use at high frequencies. When comparing these microphotographs, it is found that an alloy according to the present invention has graphite dispersed therein, while a conventional alloy has no graphite dispersed therein, in the absence of a carbon ingredient.

We claim:
1. A Fe-Co alloy magnetic core material for use with high frequency signals comprising 45 to 53% by weight of Co, 0.3 to 3% by weight of C, a total of 0.1 to 2% by weight of at least one selected from the group consisting of Mn and Si, and the balance Fe and unavoidable impurities, the structure of said alloy comprising a ferrite matrix containing graphite in an amount of from 1 to 20% by volume dispersed therein.

2. The magnetic core material of claim 1, wherein said Fe-Co alloy contains 0.5 to 1.5% by weight of C.

3. The magnetic core material of claim 1, wherein said graphite is spheroidal graphite having a mean diameter of from 0.5 to 50 μm.

4. The magnetic core material of claim 1, wherein said graphite is spheroidal graphite having a mean diameter of from 2 to 4 μm.

5. The magnetic core material of claim 2, wherein said graphite is spheroidal graphite having a mean diameter of from 2 to 4 μm.

6. A Fe-Co alloy magnetic core material for use with high frequency signals comprising 45 to 53% by weight of Co, 0.3 to 3% by weight of C, a total of 0.1 to 2% by weight of at least one selected from the group consisting of Mn and Si, a total of 0.01 to 0.2% by weight of at least one selected from the group consisting of Mg, Ca and Ce, and the balance Fe and unavoidable impurities, the structure of said alloy comprising a ferrite matrix containing spheroidal graphite in an amount of from 1 to 20% by volume dispersed therein.

7. The magnetic core material of claim 6, wherein said Fe-Co alloy contains 0.5 to 1.5% by weight of C.

8. The magnetic core material of claim 6, wherein said spheroidal graphite having a mean diameter of from 0.5 to 50 μm.

9. The magnetic core material of claim 6, wherein said spheroidal graphite having a mean diameter of from 2 to 4 μm.

10. The magnetic core material of claim 7, wherein said spheroidal graphite having a mean diameter of from 2 to 4 μm.

11. The magnetic core material of claim 6, which contains 45.5% Co, 1.00% C, 0.65% Mn and a trace amount of Mg.

12. The magnetic core material of claim 6, which contains 49.2% Co, 0.93% C, 0.74% Mn and a trace amount of Mg.

13. The magnetic core material of claim 6, which contains 52.7% Co, 1.11% C, 0.72% Mn and trace amount of Mg.

14. The magnetic core material of claim 6, which contains 49.4% Co, 0.34% C, 0.76% Mn and a trace amount of Ca.

15. The magnetic core material of claim 6, which contains 49.0% Co, 0.65% C, 0.80% Mn and a trace amount of Ce.

16. The magnetic core material of claim 1, which contains 48.6% Co, 1.04% C and 0.75% Mn.

17. The magnetic core material of claim 6, which contains 49.3%, 2.12% C, 0.72% Mn and a trace amount of Mg.

18. The magnetic core material of claim 6, which contains 48.7% Co, 2.88% C, 0.75% Mn and a trace amount of Mg.

19. The magnetic core material of claim 1, which contains 49.1% Co, 0.86% C and 0.12% Mn.

20. The magnetic core material of claim 6, which contains 49.2% Co, 0.93% C, 1.88% Mn and a trace amount of Ce.

21. The magnetic core material of claim 6, which contains 48.7% Co, 1.01% C, 0.58% Si and a trace amount of Mg.

22. The magnetic core material of claim 6, which contains 49.0% Co, 1.12% C, 0.70% Mn, 0.32% Si and a trace amount of Mg.

23. The magnetic core material of claim 6, which contains 48.4% Co, 0.97% C, 0.78% Mn and 0.02% Mg.

24. The magnetic core material of claim 6, which contains 49.1% Co, 0.90% C, 0.74% Mn and 0.08% Ca.

25. The magnetic core material of claim 6, which contains 48.3% Co, 0.92% C, 0.75% Mn and 0.18% Ce.

26. The magnetic core material of claim 6, which contains 48.6% Co, 0.96% C, 0.64% Si, 0.06% Mg and 0.02% Ca.

27. The magnetic core material of claim 6, which contains 49.0% Co, 1.01% C, 0.60% Mn, 0.55% Si, 0.04% Mg, 0.02% Ca and 0.03% Ce.

* * * * *